United States Patent [19]

Sergel et al.

[11] Patent Number: 5,215,611
[45] Date of Patent: Jun. 1, 1993

[54] METHOD AND APPARATUS FOR PRODUCING A TREAD/REINFORCEMENT BELT UNIT FOR A PNEUMATIC VEHICLE TIRE

[75] Inventors: Horst Sergel, Hanover; Michael Glinz, Neustadt, both of Fed. Rep. of Germany

[73] Assignee: Continental Akiengesellschaft, Hanover, Fed. Rep. of Germany

[21] Appl. No.: 850,411

[22] Filed: Mar. 12, 1992

[30] Foreign Application Priority Data

Mar. 14, 1991 [DE] Fed. Rep. of Germany ....... 4108261

[51] Int. Cl.[5] ............................................. B29D 30/16
[52] U.S. Cl. ..................................... 156/111; 156/117; 156/130; 156/405.1; 156/414
[58] Field of Search ............... 156/111, 117, 123, 130, 156/133, 396, 397, 405.1, 406, 406.2, 406.4, 414, 415

[56] References Cited

U.S. PATENT DOCUMENTS

| 3,844,871 | 10/1974 | Habert et al. | 156/130 X |
| 4,985,100 | 1/1991 | Sasaki et al. | 156/111 X |

FOREIGN PATENT DOCUMENTS

| 8904249 | 5/1989 | PCT Int'l Appl. | 156/123 |
| 2085376 | 4/1982 | United Kingdom | 156/396 |

*Primary Examiner*—Geoffrey L. Knable
*Attorney, Agent, or Firm*—Robert W. Becker & Associates

[57] ABSTRACT

A method and an apparatus for producing tread/reinforcement belt units for pneumatic vehicle tires in which a rotatable winding drum. a belt feeding device for a first and a second reinforcement belt layer, an overlay feeding device, a tread feeding device and a transfer device are provided. On a winding drum having double width and being axially movable, two tread/reinforcement belt units are simultaneously produced whereby in the first method steps the individual reinforcement belt layers are produced, subsequently two wound overlays are produced, and then two treads are applied one after another or simultaneously.

10 Claims, 3 Drawing Sheets

METHOD AND APPARATUS FOR PRODUCING A TREAD/REINFORCEMENT BELT UNIT FOR A PNEUMATIC VEHICLE TIRE

BACKGROUND OF THE INVENTION

The present invention relates to a method and an apparatus for producing a tread/reinforcement belt unit for a pneumatic vehicle tire in which a rotatable winding drum, a belt feeding device for a first and a second reinforcement band, an overlay feeding device, a tread feeding device and a transfer device are provided.

Recently, various methods for producing a tread/reinforcement belt unit by using overlays in the form of wound overlays have become available. In these known methods the problem arises that the winding of the overlay onto the winding drum requires considerably more time than the application of the individual reinforcement belt layers, respectively, the tread, so that the time requirements for the working cycle are considerably increased. Methods have been known in which the working steps of applying the reinforcement belt layers and the winding of the overlay are decoupled in such a manner that these steps may be performed simultaneously. However, this requires two completely independent winding drums.

It is therefore an object of the present invention to provide a method of the aforementioned kind with which a sufficient number of tread/reinforcement belt units may be produced on a single winding drum in a given short time span.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
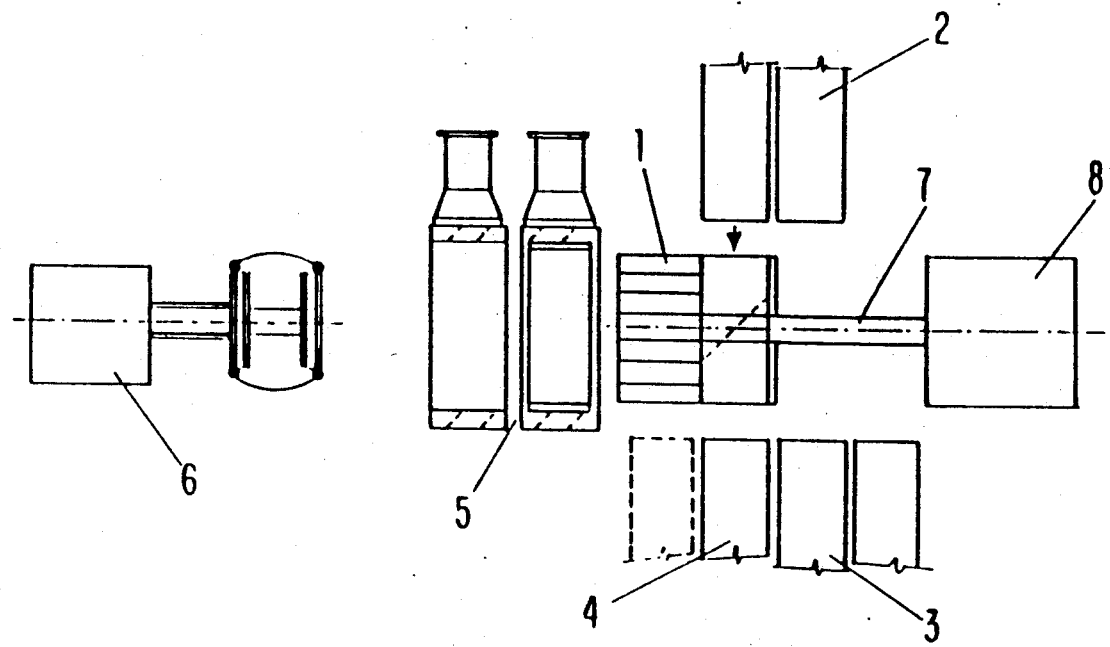
FIG. 1 shows an arrangement with a winding drum of a double width in a first operating position.
Figure 2:
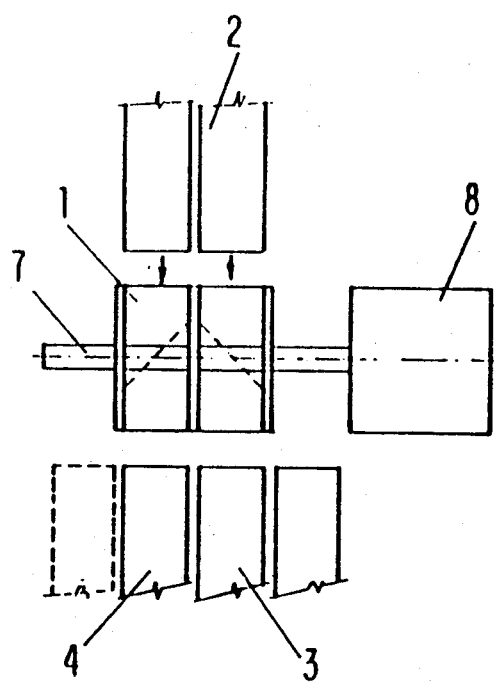
FIG. 2 shows the arrangement of FIG. 1 with the winding drum in a second operating position.

The method for producing a tread/reinforcement belt unit for a pneumatic vehicle tire according to the present invention comprises the following steps:

a) applying a first reinforcement belt band arranged on a belt feeding device to a first half of a winding drum, the winding drum being in a first operating position relative to the belt feeding device, to form a first reinforcement belt layer;

b) displacing the winding drum and the belt feeding device relative to one another into a second operating position in which a second reinforcement belt band is opposite the first half of the winding drum and in which the first reinforcement belt band is opposite a second half of the winding drum;

c) simultaneously applying the first reinforcement belt band to the second half and the second reinforcement belt band as a second reinforcement belt layer to the first half;

d) displacing the winding drum and the belt feeding device relative to one another into a third operating position in which the second reinforcement belt band is opposite the second half of the winding drum;

e) applying the second reinforcement belt band to the second half as a second reinforcement layer to the second half;

f) simultaneously winding a wound overlay to the first and the second halves onto the second reinforcement belt layers;

g) applying a respective tread to the first and the second halves to the wound overlays to complete respective tread/reinforcement belt units on the first and the second halves; and h) removing the tread/reinforcement belt units from the first and second half of the winding drum with a transfer device.

In step g) of the above method, it is possible to apply the treads one after another or simultaneously. In step h) the tread/reinforcement belt units may be removed one after another or simultaneously. For displacing the winding drum and the belt feeding device relative to one another, it is possible to provide a stationary belt feeding device while the winding drum is axially displaceable. The transfer device may comprise a double transfer ring.

Step g) may be carried out in the first operating position, whereby the tread is simultaneously applied to the first and the second halves of the winding drum. It is also possible to carry out step g) such that a first one of the treads is applied in the second operating position and the second one of the treads is applied in a first operating position.

The apparatus for producing a tread/reinforcement belt unit for a pneumatic vehicle tire according to the present invention is comprised of a gear box/engine block arrangement, a drive shaft connected to the gear box/engine block arrangement, a rotatable winding drum connected to the drive shaft, the winding drum being of a double width for producing two tread/reinforcement belt units next to one another, a belt feeding device for a first and a second reinforcement belt band coordinated with the winding drum, an overlay feeding device coordinated with the winding drum, a tread feeding device coordinated with the winding drum, and a transfer device coordinated with the winding drum.

It is preferable that the overlay feeding device has two feeding units for simultaneously applying two overlays. It is furthermore expedient, that the belt feeding device has two feeding units for simultaneously applying a first and a second reinforcement belt layer.

In an advantageous embodiment of the present invention, the winding drum is axially movable for a displacement relative to the belt feeding device. It is expedient that the belt feeding device on the one hand and the overlay feeding device together with the tread feeding device on the other hand are arranged on opposite sides of an axial extension of the drive shaft, the belt feeding device, the overlay feeding device and the tread feeding device being stationary.

In another embodiment of the present invention, the belt feeding device is axially movable for a displacement relative to the winding drum. It is preferred that the winding drum is stationary, and the winding drum, the belt feeding device, the overlay feeding device and the tread feeding device are positioned essentially at a same axial distance relative to the drive shaft corresponding to the position of the winding drum, whereby the belt feeding device, the overlay feeding device and the tread feeding device are staggered relative to one another in a circumferential direction about the winding drum, and are stationary.

It is also possible that the winding drum and the belt feeding device are axially movable relative to one another.

It is preferred that the tread feeding device has two feeding means for simultaneously applying two treads. In another embodiment, the tread feeding device has one feeding unit for applying a single tread. In a further embodiment of the present invention, the belt feeding device is comprised of two individual stationary feeding units, whereby the winding drum, the feeding units, the overlay feeding device and the tread feeding device are stationarily positioned essentially at a same axial distance relative to the drive shaft corresponding to the position of the winding drum, with the belt feeding device, the overlay feeding device and the tread feeding device being staggered relative to one another in a circumferential direction about the winding drum.

The gist of the present invention is that the time consuming winding of the overlay is carried out such that two wound overlays are simultaneously generated. This is advantageous because the manufacturing time for each individual overlay is thus cut in half. Further advantages result from the fact that two reinforcement belt layers and optionally two treads may be simultaneously applied to the winding drum. In a preferred embodiment the winding drum having a double width is movable into three operating positions whereby in its vicinity on one side of the drive shaft a belt feeding device is positioned for feeding a first and a second reinforcement belt band while on the other side of the drive shaft the overlay feeding device for two overlays as well as a tread feeding device are arranged adjacent to one another in a fixed position. The method may also be carried out with an arrangement in which the winding drum itself is stationary and in which the overlay feeding device the tread feeding device and the belt feeding device are essentially positioned at the same axial distance relative to the drive shaft corresponding to the position of the winding drum and, in a circumferential direction of the winding drum are staggered relative to one another whereby only the belt feeding device is axially movable.

DESCRIPTION OF PREFERRED EMBODIMENTS

The present invention will now be described in detail with the aid of several specific embodiments utilizing FIGS. 1 through 9.

FIG. 1 represents the inventive apparatus having an arrangement with a winding drum 1, a belt feeding device 2, an overlay feeding device 3, a tread feeding device 4, a transfer device 5 and a dishing station 6. The winding drum 1 which, in a conventional manner is radially expandable, is connected to a drive shaft 7 which extends into a gear box/engine block arrangement 8. The winding drum 1 has an axial extension that allows to generate two tread/reinforcement belt units adjacent to one another. In the vicinity of the winding drum 1 on one side of the drive shaft 7, the belt feeding device 2 which is provided with feeding units for two reinforcement belt bands for a first reinforcement belt layer and a second reinforcement belt layer is provided. The winding drum 1 is axially movable and, in the position shown in FIG. 1, is in its first operating position. In this first operating position, the right half of the winding drum 1 is arranged opposite the first reinforcement belt band for a first reinforcement belt layer. The winding drum 1 is movable into a further operating position in which further elements for the two tread/reinforcement belt units may be applied. This will be explained in detail in the paragraphs below. In the represented embodiment, the transfer device 5 is comprised of a double transfer ring arrangement which serves to receive the two finished tread/reinforcement belt units from the winding drum 1 and to transfer them to the dishing station 6 where, in a conventional manner, a carcass is introduced into the tread/reinforcement belt unit. One of the transfer rings of the double transfer ring arrangement serves as a storage device for one of the tread/reinforcement belt units.

The overlay feeding device 3 is in the form of a twin feeding with two feeding units device so that simultaneously two identical overlay strips for generating an overlay may be fed to the winding drum 1. The feeding speed during the winding step of the two wound overlays is generated with conventional means. To the left of the overlay feeding device 3, a tread feeding device is positioned which may be provided with one reinforcement belt band or with a twin feeding device with two feeding units for simultaneously applying two treads.

Figure 3:
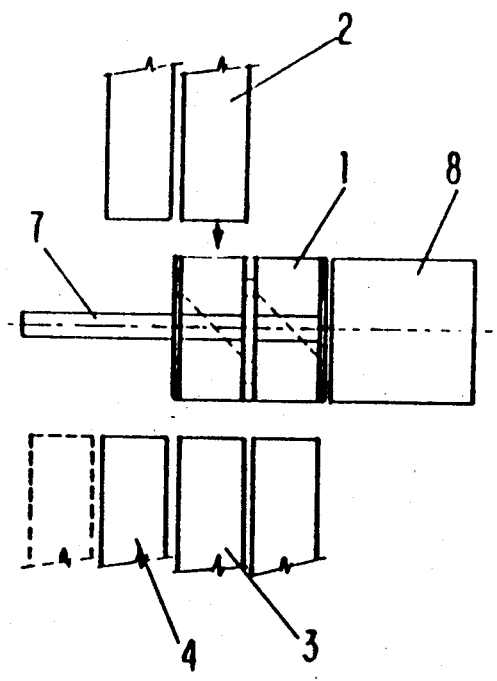
FIG. 3 shows the arrangement of FIG. 1 with the winding drum in a third operating position.
Figure 4:
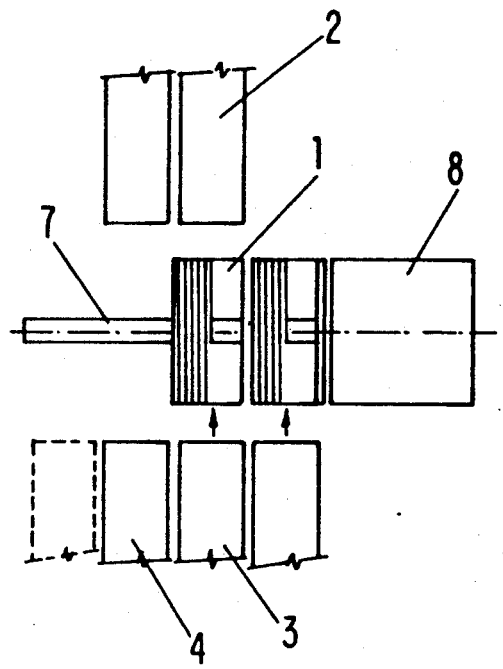
FIG. 4 shows the arrangement of FIG. 1 with the winding drum in the third operating position for winding the overlay.
Figure 5:
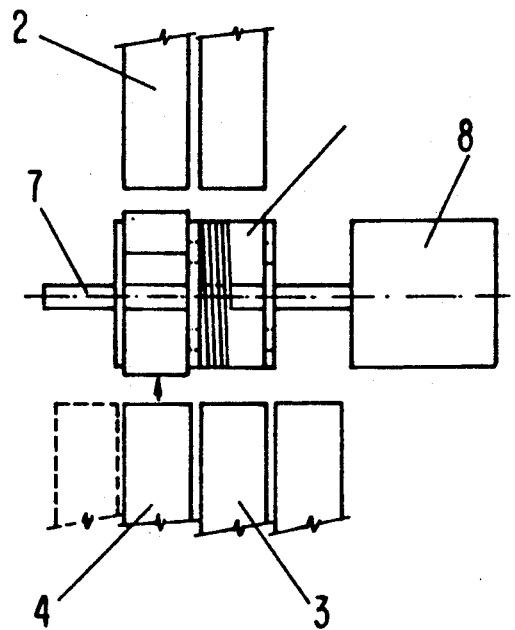
FIG. 5 shows the arrangement of FIG. 1 with the winding drum in the second operating position for applying a first tread.
Figure 6:
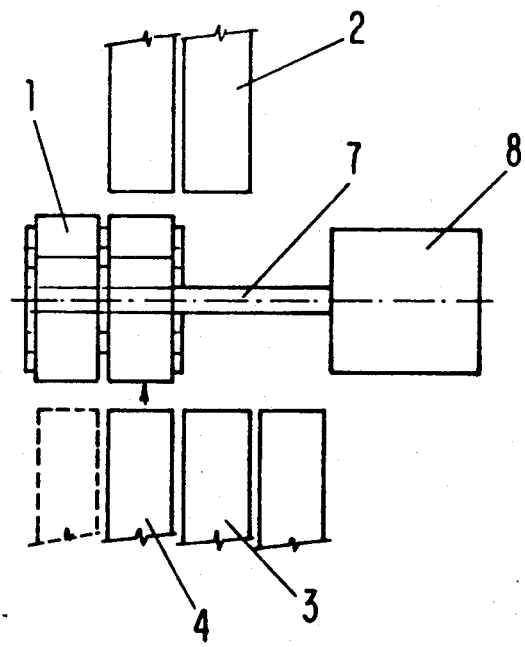
FIG. 6 shows the arrangement of FIG. 1 with the winding drum in the first operating position for applying a second tread.
Figure 7:
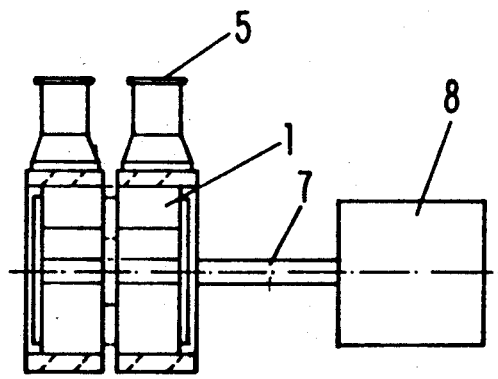
FIG. 7 shows the arrangement of FIG. 1 with the winding drum in the first operating position for removing the finished tread/reinforcement belt unit.

In the following the inventive method will be explained with the aid of the individual figures. In the first operating position of the winding drum 1, according to FIG. 1, a first reinforcement belt layer is produced from the left (first) reinforcement belt band withdrawn from the belt feeding device 2 and applied to the right half of the winding drum 1. Subsequently, the winding drum 1 is axially moved into the second operating position in which the second (right) reinforcement belt band of the belt feeding device 2 is arranged opposite the right half of the winding drum 1 while the first reinforcement belt band is opposite the left half of the winding drum 1. In this second operating position, the simultaneous application of a second reinforcement belt layer onto the already present first reinforcement belt layer on the right half of the winding drum and a first reinforcement belt layer within the area of the left half of the winding drum 1 takes place. Then the winding drum 1 is moved into a third operating position in which both halves are opposite to the two feeding units of the overlay feeding device 3 (FIG. 3). At the same time, the second reinforcement belt band is arranged opposite the left half of the winding drum 1 in this position so that a second reinforcement belt layer may be applied to the first reinforcement belt layer on the left half of the winding drum 1. After the completion of the two reinforcement belt layers on both halves of the winding drum 1 the winding of two overlays takes place simultaneously, whereby two overlay strips are simultaneously removed from the overlay feeding device 3 and wound onto the two reinforcement belt packages of the winding drum 1 in a coil-shaped fashion. The feeding speed, respectively, axial displacement speed, is controllable if so desired so that neighboring strips of the overlay may be placed adjacent to one another or in an overlapping fashion.

After the completion of the two overlays on the winding drum 1 two treads are applied one after another or simultaneously to the two halves of the winding drum 1, depending on whether the tread feeding device 4 is embodied to provide a single tread or with a twin feeding device with two feeding units. In the case of a single tread feeding unit, the winding drum is first moved from the third operating position into the second operating position in which the tread feeding unit is opposite to the left half of the winding drum 1. In this position the tread is supplied to the reinforcement belt-/overlay package on the left half of the winding drum 1 and, subsequently, the winding drum 1 is moved into the first operating position in which a further tread is applied to the reinforcement belt/overlay package on the right half of the winding drum. When the tread feeding device 4 is comprised of two feeding unit with two simultaneously feedable treads, the winding drum 1, after the completion of the overlays in the third operating position, is immediately moved into the first operating position in which the treads may be applied simultaneously.

After the completion of the two tread/reinforcement belt units the double transfer ring arrangement of the transfer device 5 is axially moved over the winding drum and preferably removes both tread/reinforcement belt units simultaneously so that they may be transferred one after another to the dishing station 6 whereby, intermediately, one transfer ring serves as a storage device. The first cycle is now finished and the winding drum is in its initial position in which a second cycle for producing two tread/reinforcement belt units may begin.

Of course, it is also possible to modify the arrangement such that instead of an axial movement of the winding drum 1 the belt feeding device 2 may be embodied so as to be axially movable.

Figure 8:
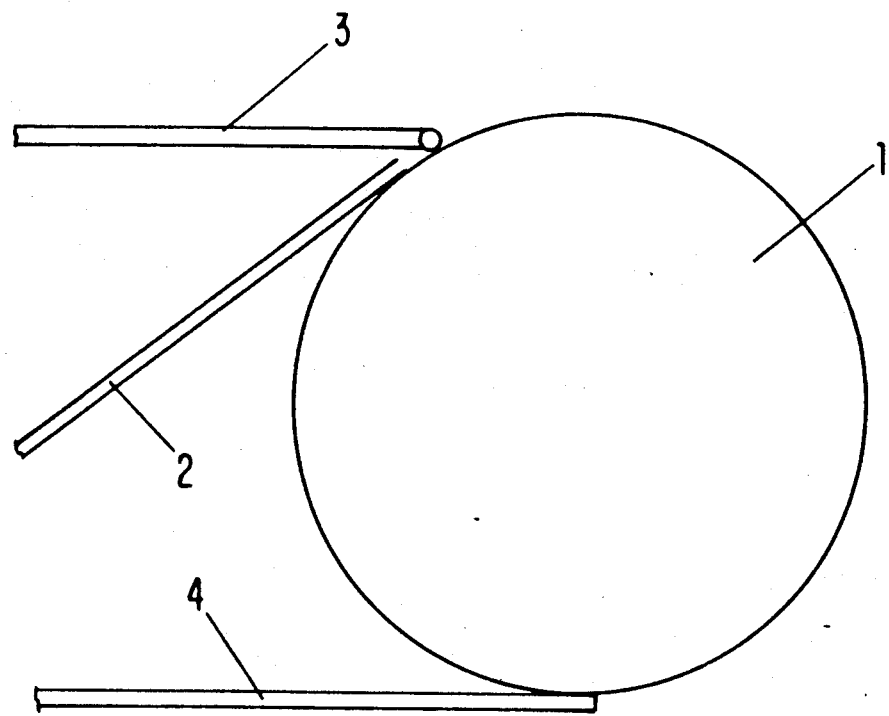
FIG. 8 shows a winding drum with a belt feeding device an overlay feeding device, and a tread feeding device staggered about the winding drum in a circumferential direction.

FIG. 8 shows a further arrangement with which two wound overlays may be produced simultaneously for the generation of two tread/reinforcement belt units, whereby however the winding drum 1 is not axially movable so that all method steps are carried out in the same operational position of the winding drum. For this purpose it is required that the belt feeding device 2, the overlay feeding device 3 and the tread feeding device 4 in the axial direction of the drive shaft are essentially positioned at the same axial distance as the winding drum 1 and are arranged in a staggered fashion in the circumferential direction of the winding drum 1. While in the axial direction the overlay feeding device 3 and the tread feeding device 4 may be stationary it is required that the belt feeding device 2 is axially movable relative to the winding drum 1. In the embodiment represented in FIG. 8 the winding drum 1 is shown on the right side of the drawing while on the top left side the overlay feeding device 3 and below the belt feeding device 2 are arranged. At the left bottom corner, the tread feeding device 4 for simultaneously applying two treads is shown. In order to produce two tread/reinforcement belt units the individual reinforcement belt layers are first applied in the manner described in example 1 (FIGS. 1–3) whereby however the winding drum 1 is stationary while the belt feeding device 2 is axially movable. After the application of the two reinforcement belt layers on both halves of the winding drum 1, the simultaneous winding of two overlays and the subsequent simultaneous application of two treads takes place. If it is desired that the reinforcement belt package should be provided with more than two reinforcement belt layers, individual method steps for the application of the reinforcement belt layers may be repeated accordingly.

Figure 9:
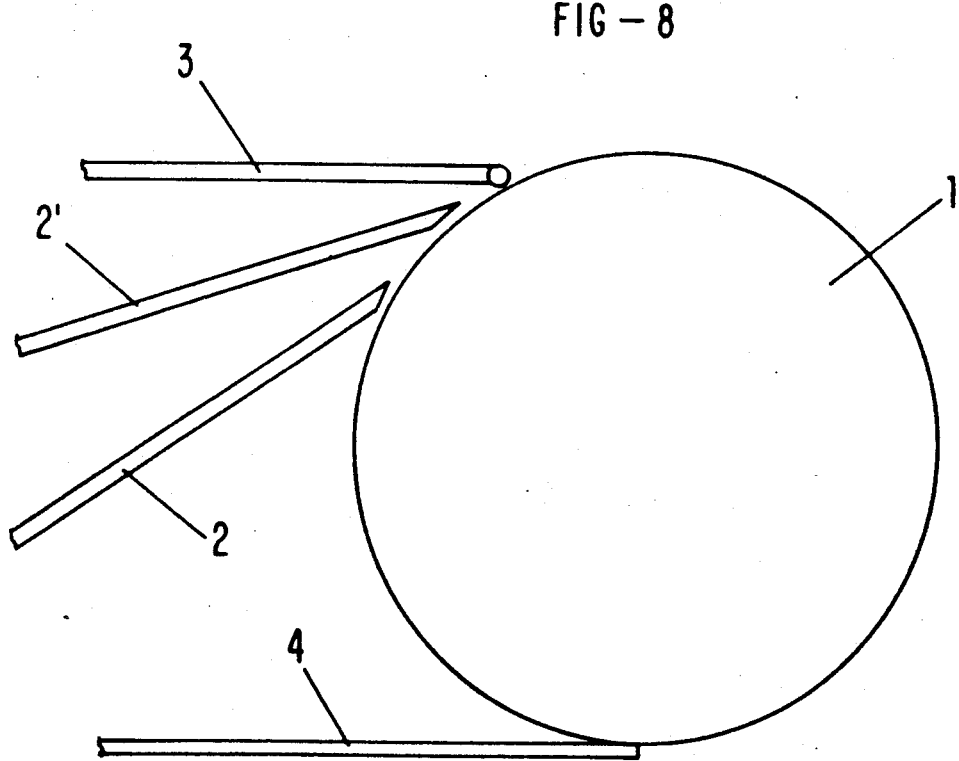
FIG. 9 shows an arrangement according to FIG. 8 with two separate belt feeding units, all of which are staggered relative to one another in a circumferential direction of the winding drum.

FIG. 9 shows an example similar to the one represented in FIG. 8 however in this representation the belt feeding device 2 is no longer axially movable. The overlay feeding device 3 and the tread feeding device 4 are arranged in the same manner as indicated in FIG. 8. For the application of the reinforcement belt layers, two feeding units 2 and 2' are provided. Each one of the feeding units 2, 2' is provided with two adjacently arranged reinforcement belt bands which are arranged opposite the two halves of the winding drum 1. The two reinforcement belt bands of the feeding unit 2 contain two first reinforcement belt bands with cord fibers of a first inclination. In the bands of the second feeding means 2', the second reinforcement belt band for the second reinforcement belt layer is provided with cord fibers of an opposite inclination cord. For the simultaneous production of two tread/reinforcement belt units two first reinforcement belt layers are applied simultaneously, then two second reinforcement belt layers are placed on top. Then the simultaneous winding of two overlays and subsequently the simultaneous application of two treads is carried out.

The present invention is, of course, in no way restricted to the specific disclosure of the specification and drawings, but also encompasses any modifications within the scope of the appended claims.

What we claim is:

1. A method for producing a tread/reinforcement belt unit for a pneumatic vehicle tire, comprising the steps of:
   a) applying a first reinforcement belt band arranged on a belt feeding device to a first half of a winding drum, said winding drum being in a first operating position relative to said belt feeding device, to form a first reinforcement belt layer;
   b) displacing said winding drum and said belt feeding device relative to one another into a second operating position in which a second reinforcement belt band is opposite said first half of said winding drum and in which said first reinforcement belt band is opposite a second half of said winding drum;
   c) simultaneously applying said first reinforcement belt band to said second half and said second reinforcement belt band as a second reinforcement belt layer to said first half of said winding drum;
   d) displacing said winding drum and said belt feeding device relative to one another into a third operating position in which said second reinforcement belt band is opposite said second half of said winding drum;

e) applying said second reinforcement belt band to said second half as a second reinforcement layer to said second half;

f) simultaneously winding a wound overlay to said first and said second halves onto said second reinforcement belt layers;

g) applying a respective tread to said first and said second halves to said wound overlays to complete respective tread/reinforcement belt units on said first and said second halves; and h) removing said tread/reinforcement belt units from said first and second halves of said winding drum with a transfer device.

2. A method according to claim 1, wherein in said step g) said treads are applied one after another.

3. A method according to claim 1, wherein in said step g) said treads are applied simultaneously.

4. A method according to claim 1, wherein in said step h) said tread/reinforcement belt units are removed one after another.

5. A method according to claim 1, wherein in said step h) said tread/reinforcement belt units are removed simultaneously.

6. A method according to claim 1, wherein said winding drum is axially displaceable and said belt feeding device is stationary.

7. A method according to claim 1, wherein said step f) is carried out in said third operating position.

8. A method according to claim 1, wherein said step g) is carried out in said first operating position and wherein said tread is simultaneously applied to said first and said second halves.

9. A method according to claim 1, wherein said step g) further comprises applying a first one of said treads in said second operating position and applying a second one of said treads in a first operating position.

10. A method according to claim 1, wherein said transfer device comprises a double transfer ring arrangement.

* * * * *